United States Patent [19]
Kogiso et al.

[11] 3,915,741
[45] Oct. 28, 1975

[54] SODIUM-SULFUR CELL WITH IMPROVED SEPARATOR

[75] Inventors: Takeshi Kogiso; Hiroaki Hayashi, both of Nagoya, Japan

[73] Assignee: Kabushiki Kaisha Toyota Chuo Kenkyusho, Japan

[22] Filed: July 17, 1974

[21] Appl. No.: 489,381

[30] Foreign Application Priority Data
July 30, 1973 Japan.................................. 48-86068
Aug. 11, 1973 Japan.................................. 48-90430
June 4, 1974 Japan.................................. 49-63250

[52] U.S. Cl. ................................ 136/6 FS; 136/153
[51] Int. Cl. ........................................... H01m 43/00
[58] Field of Search ......... 136/6 FS, 6 F, 6 LF, 6 L, 136/83 R, 20, 153, 100 R

[56] References Cited
UNITED STATES PATENTS

| | | | |
|---|---|---|---|
| 3,413,150 | 11/1968 | Kummer et al..................... | 136/6 FS |
| 3,432,363 | 3/1969 | Gillis................................... | 136/153 |
| 3,476,602 | 11/1969 | Brown et al. ..................... | 136/6 FS |
| 3,481,788 | 12/1969 | Hamlen et al. ................. | 136/153 X |

*Primary Examiner*—Anthony Skapars
*Attorney, Agent, or Firm*—Hill, Gross, Simpson, Van Santen, Steadman, Chiara & Simpson

[57] ABSTRACT

A sodium-sulfur cell having improved safety features and a high level of performance, embodying a solid electrolyte separator with a plurality of elongated small holes extending in side-by-side relation through the separator in parallel relationship with the major surfaces of the separator, the separator having at least one passage formed therein to function as a reservoir for delivering molten sodium to the elongated holes.

18 Claims, 9 Drawing Figures

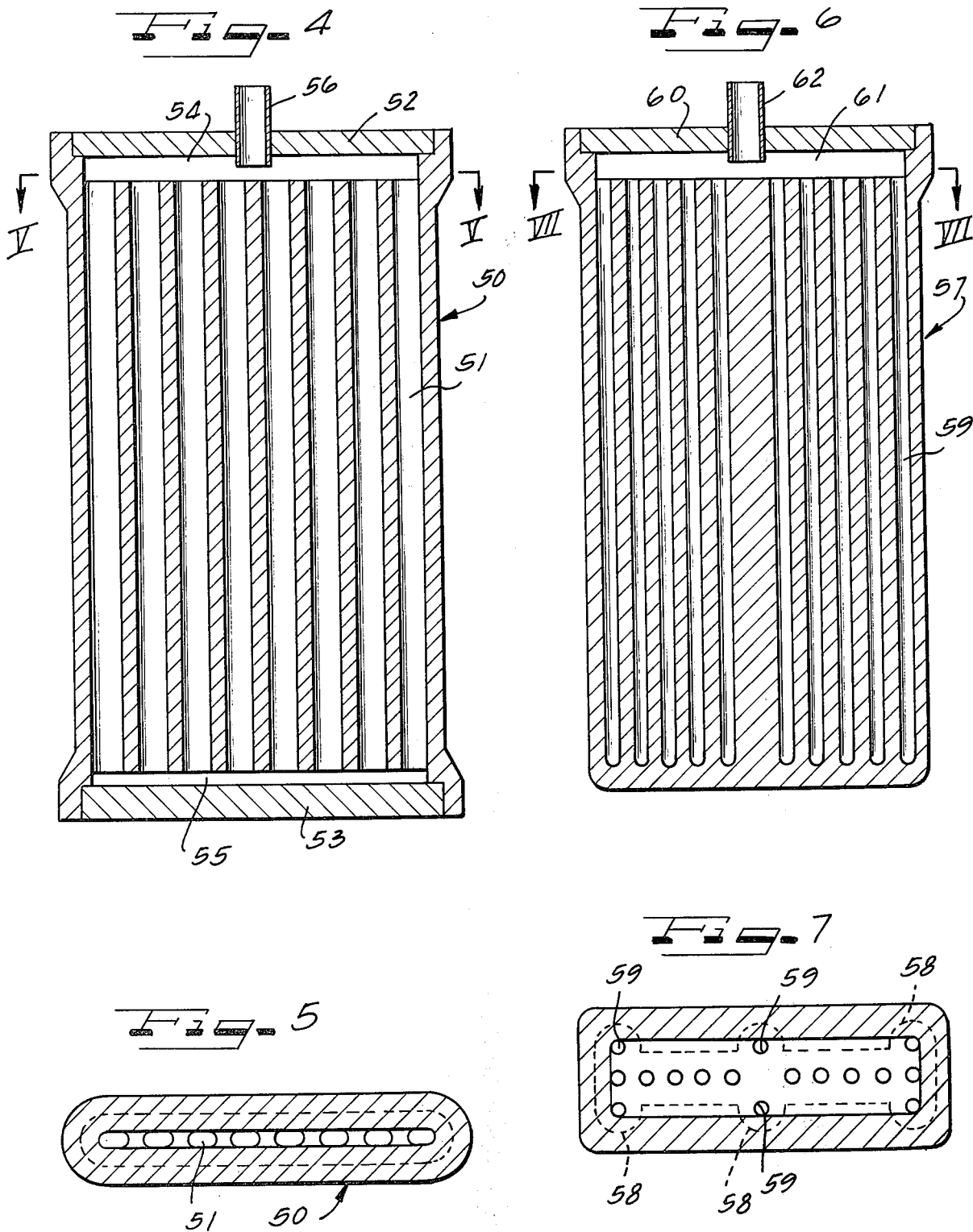

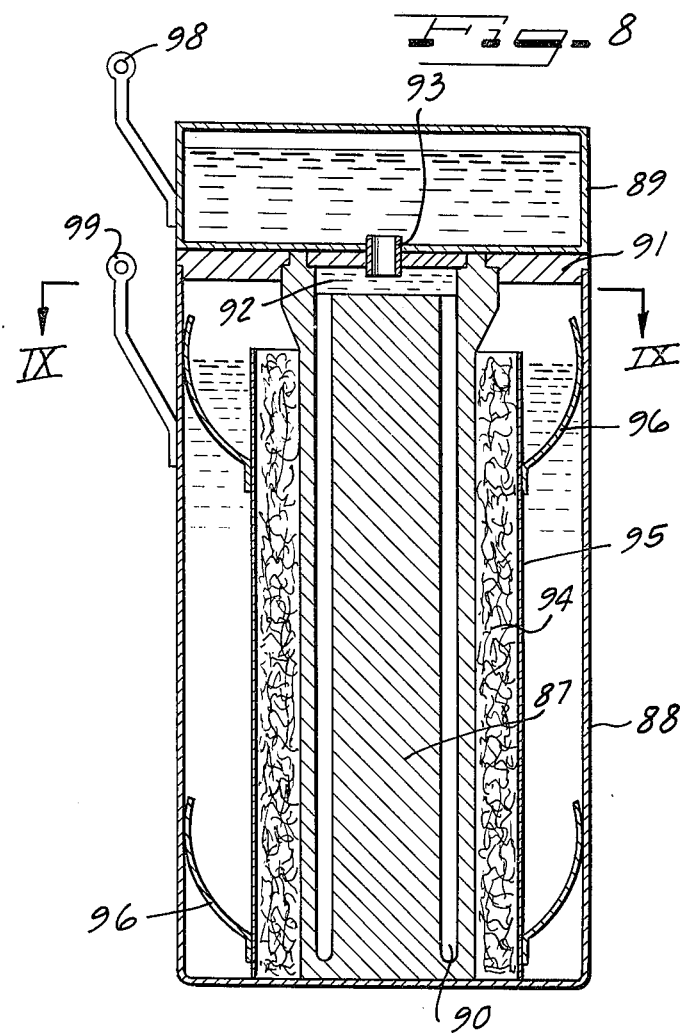
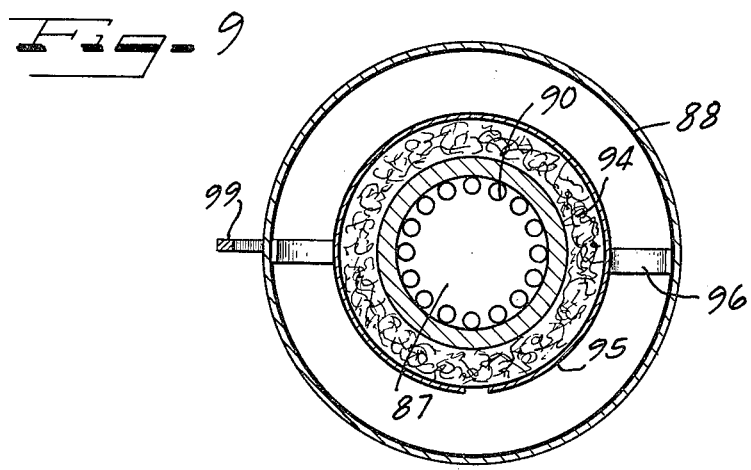

3,915,741

SODIUM-SULFUR CELL WITH IMPROVED SEPARATOR

BACKGROUND OF THE INVENTION

1. Field of the Invention

This invention is in the field of sodium-sulfur cells and more specifically to a sodium-sulfur cell having a solid electrolytic separator having a plurality of elongated small holes extending in parallel relationship to the outer working surfaces of the separator.

2. Description of the Prior Art

The conventional sodium-sulfur cell includes a solid electrolyte separator through which sodium ions can be passed, with molten dosium being disposed on one side of the electrolyte as an anode reactant, and molten sulfur being disposed on the other side of the solid electrolyte as a cathodde reactant. There is a porous current collector impregnated with molten sulfur and in contact with the solid electrolyte. During the discharge of the cell, the sodium is ionized, and the sodium ions pass through the solid electrolyte to react with sulfur in the current collector to thereby form polysulfides. The energy generated by this reaction is taken out of the cell through suitable leads. During the subsequent charging of the cell, a current is supplied from an external source in the reverse direction, and the current decomposes the polysulfides into sodium ions and sulfur ions. The sodium ions pass back to the negative pole through the solid electrolyte and then become metallic sodium by adding electrons. The sulfur is maintained in the same place, and the electrons are taken to outer circuits of the cell. The cell is operated at about 300°C to keep the sodium, sulfur, and sulfur having dissolved polysulfide in liquid state, thereby lowering the resistance of the solid electrolyte.

The conventional type sodium-sulfur all has certain shortcomings, particularly the danger of causing an abrupt exothermic reaction wherein a large amount of molten sodium is brought into contact with molten sulfur. Thus, while sodium-sulfur cells are quite efficient they have not been extensively used in the art.

SUMMARY OF THE INVENTION

The present invention provides a sodium-sulfur cell having a sodium reservoir containing most of the molten sodium, with a novel separator being provided with a plurality of elongated small holes extending in side-by-side relation in the separator in parallel relationship with the surfaces of the separator. A small connecting passage is provided which communicates the molten sodium from the reservoir into the small holes of the separator. The reservoir is made of metal such as stainless steel and contains the remaining molten sodium. The connecting means has a relatively long through passage with a small cross-sectional area, one of the ends of the passage opening in the reservoir and the other being connected to the small holes of the separator to transfer the molten sodium from the reservoir to the separator or vice versa. Molten sulfur and an electric current collector are immersed in molten sulfur in a separate casing.

The sodium-sulfur cell is intended to operate at about 300°C. The wall of the separtor, i.e., the portion between the inner surfaces of the elongated small holes and the outer surfaces of the separator words on a solid electrolyte. Sodium contained in the elongated small holes passes through the wall of the separator as sodium ions to the side containing molten sulfur. Sodium in an amount equal to that consumed is supplied from the reservoir through the connecting means so that a constant amount of sodium may be maintained in the elongated small holes of the separator. The sodium passing through the wall reacts with the sulfur to produce sodium polysulfide which remains in the molten sulfur and is maintained there. The electric current which is produced in the cell is taken out through a positive lead connected to the electric current collector and through a negative lead connected to the reservoir. Sodium has a high elecrical conductivity, so the current is transferred through the molten sodium itself from the elongated small holes to the reservoir.

The sodium appearing in the elongated, small holes forms, in effect, a thin sodium layer just inside the surfaces of the separator. The outer surfaces of the separator function as the effective surface of the solid electrolyte. This construction of the separator requires a smaller amount of sodium to form given amount of surface area of the solid electrolyte compared with the conventional tube-shaped separator. This reduction of the amount of sodium necessary in the separator improves the safety and performance of the cell. The reduction of the amount of sodium in the separator reduces the amount of energy produced by the reaction of sodium with sulfur which could result from the breakage of the separator. Since the molten sodium is contained separately in a plurality of elongated, small holes, most of the molten sodium will not effuse from the separator at the same time, even if the separator is broken due to impact. The sodium contained in the separator is usually under a reduced pressure or a substantial vacuum so that molten sulfur would follow into the separator in such an event. However, the molten sulfur which appears in the elongated, small holes reacts with molten sodium remaining therein to produce sodium polysulfides which have high melting points, while the heat produced thereby may be immediately removed through the inner wall surface of the separator. Consequently, the sodium polysulfides will be solidified within the elongated small holes to thereby block the holes and preclude contact of molten sodium from additional amounts of molten sulfur while preventing reverse flow of the molten sulfur into the sodium reservoir. Thus, the reservoir which contains a greater part of the molten sodium may be maintained safely. The reduction of sodium in the separator also improves the performance of the cell. If all of the sodium in the reservoir were consumed and the remaining sodium in the separator begins to be used, the output current of the cell begins to decrease sharply. The reduction of the sodium in the separator contributes directly to the decrease of the weight in the cell without lowering the functions of the cell.

The area of solid electrolytic partition walls of the separator which contacts the molden sodium can be equal to that of a solid electrolytic partition used in conventional cylindrical separators. With conventional sodium-sulfur cells, the strength of the separator depends on the distance between the wall surface which contacts molten sodium and the surface which contacts molten sulfur, i.e., the wall thickness of the separator, such that the thickness of the partition wall is inherently limited from strength requirements. In contrast, the strength of the separator of this invention depends on the thickness of the separator and is partially affected by the relative positions of the elongated small holes in the cross-section of the separator and by the ratio of the holes occupied to the cross-sectional area of the separator. The distance between the inner surface of the elongated small holes and the outer wall surface of the separator which contacts the molten sulfur may be reduced to a considerable extent without lowering the strength of the separator greatly.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 3 is a transverse cross-sectional view of the cell shown in FIG. 2;

FIG. 4 is a lateral cross-sectional view of a modified form of separator;

FIG. 5 is a horizontal cross-sectional view taken along the line V—V of FIG. 4;

FIG. 6 is a lateral cross-sectional view of another form of separator;

FIG. 7 is a horizontal cross-sectional view taken along the line VII—VII of FIG. 6;

FIG. 8 is a cross-sectional view of another embodiment of the present invention; and FIG. 9 is a horizontal cross-sectional view taken along the line IX—IX of FIG. 8.

DESCRIPTION OF THE PREFERRED EMBODIMENTS

Figure 1:
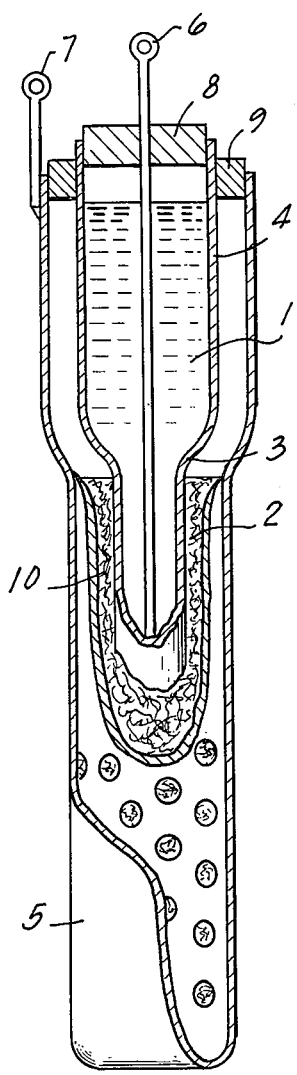
FIG. 1 is a cross-sectional view, partly broken away, of a typical prior art sodium-sulfur cell.

FIG. 1 illustrates the construction of a conventional type sodium-sulfur cell in which molten sodium 1 is contained in a tube 3 composes of beta alumina or the like and serves as a solid electrolyte. The tube 3 is formed into a reservoir portion 4. Molten sulfur 2 is contained in a tubular protective casing 5, the tube 3 being immersed into the molten sulfur. The wall of the tube 3 thus isolates the molten sodium from the molten sulfur and at the same time serves as a solid electrolytic separator. Electric current produced in the cell is extracted through a negative lead 6 made of stainless steel or the like which is immersed on the molten sodium and through a positive lead 7 leading to a current collector 10 composed of graphite fibers or the like which surround the tube 3 and are immersed in the molten sulfur 2. The top openings of the reservoir 4 and the protective casing 5 are closed with plugs 8 and 9 to prevent entry of air and the like, the interior of the reservoir 4 and protective casing 5 being maintained under substantially vacuum conditions. The cell is intended to operate at a temperature of about 300°C.

Figure 2:
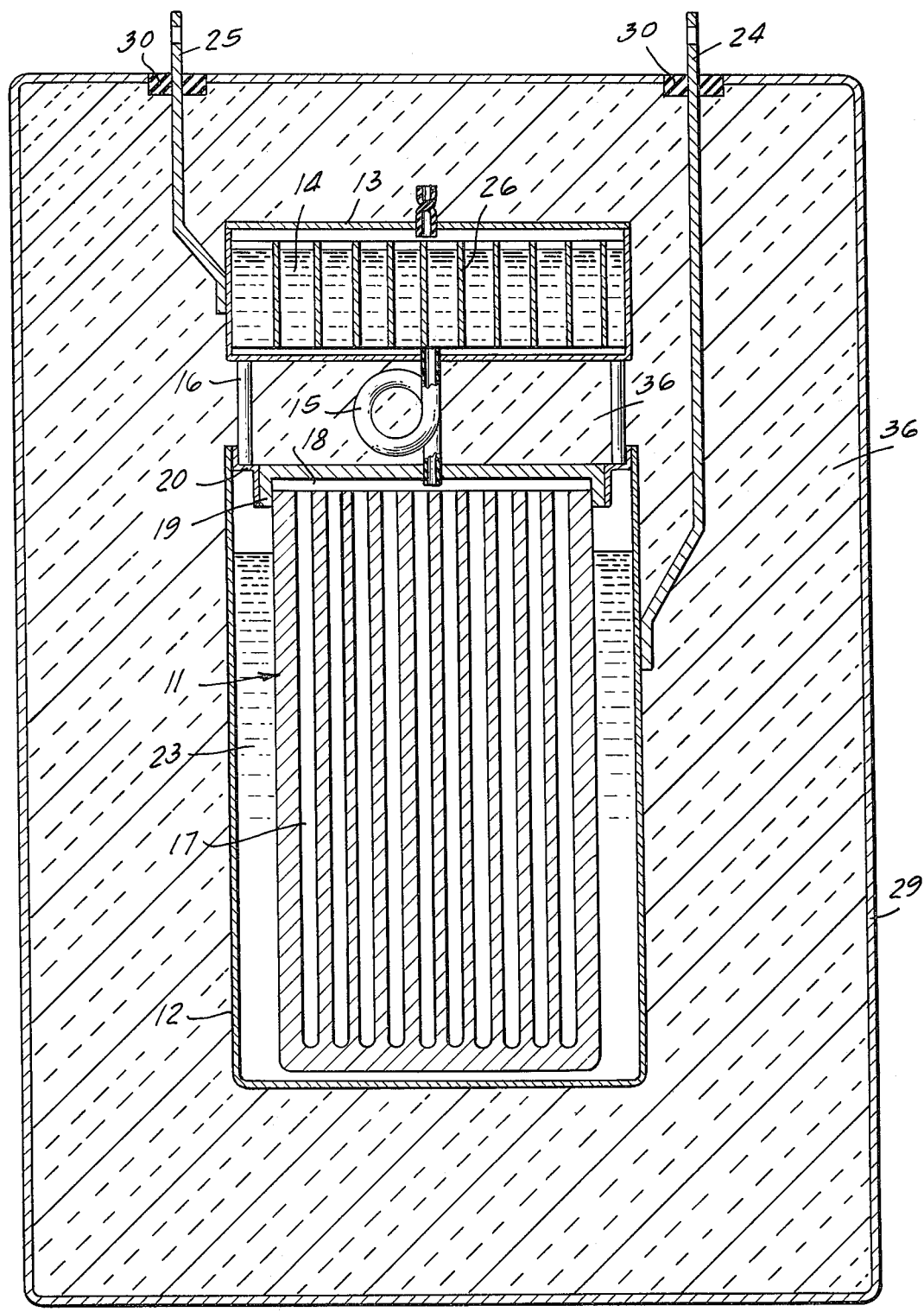
FIG. 2 is a lateral cross-sectional view of an improved cell according to the present invention.

Turning now to FIGS. 2 and 3, the cell of the present invention incudes a separator 11 which serves as a solid electrolyte and is of generally flat configuration. The separator 11 is housed in a cathodic casing 12. A reservoir 13 which contains molten sodium 14 therein is provided separately from the separator 11, as well as the cathodic casing 12, the reservoir 13 is communicating with the separator 11 through a communicating tube 15 of small diameter. The cathodic casing 12 and the reservoir 13 are separated by fixed columns 16. The separator 11 has a thickness of about 3 millimeters, a length of about 32 millimeters, and a height of about 110 millimeters. Elongated, small diameter holes 17, 10 of which are shown in the drawings, extend through the separator 11 from the top to near to bottom thereof in side-by-side relation. These holes may have a diameter of about 1.5 millimeters and a length of about 100 millimeters, the top openings of the blind-ended holes being in communication with a passage 18. The separator 11 may consist of a sintered body consisting essentially of sodium beta-alumina. The diameters of the elongated small holes 17 may be reduced slightly as they go from the top to the bottom and are arranged in side-by-side relation to each other in the laterally central portion of the separator 11 and extend at equal spacings from each other. The minimum spacing between the adjoining holes is about 1.5 millimeters. Fitted in the opening of the separator 11 is a lid 19 of beta-alumina which cooperates with the separator to devine the passage 18.

On the outer periphery of the lid 19 there is a brim 20 made of stainless steel and secured thereto by means of glass solder, the lid 19 and the brim 20 forming a cover for the casing 12 which contains molten sulfur.

The outer peripheral surface of the separator 11 is surrounded with graphite fibers 21 which serve as current collecting bodies, the fibers 21 being elastically urged together by means of a pressure plate 22 composed of a stainless steel corrugated plate. The casing 12 is also made of stainless steel. The upper portion of the casing 12 is welded to the brim 20 to provide a space for molten sulfur 23 and the sodium polysulfide which is produced. Welded to the outer surface of the casing 12 is a cathode terminal 24.

The reservoir 13 containing molten sodium 14 is made of stainess steel and is of generally rectangular configuration, supported by the fixed columns 16 above the casing 12. An anode terminal 25 is welded to the outer surface of the reservoir 13, with the reservoir 13 being electrically insulated from the casing 12.

In the reservoir 13, a corrugated plate 26 composed of stainless steel is placed so that each of the ridges of the corrugated plate contacts the opposing inner side walls of the reservoir 13. The corrugated plate 26 functions to sustain the atmospheric pressure on the outer surface of the reservoir 13. The reservoir 13 and the separator 11 are sealingly closed after introducing molten sodium therein, and argon gas is introduced into the upper space of the reservoir under a reduced pressure. Next, a mineral fiber such as asbestos 36 is packed in the space formed between the reservoir 13 and the lid 19. On each of the front and back surfaces of the separator 12, an insulator plate 27 made of asbestos and a heater plate 28 consisting of two mica plates and a heater wire placed around the mica plates are positioned. The whole assembly is then put in a case 29 made of stainless steel, and additional amounts of asbestor 36 are packed into the remaining space of the case 29 and then the cover is welded on. The positive and negative leads 24 and 25 project through the lid through holes provided for that purpose. The leads 24 and 25 are insulated from the case by means of rubber plugs 30 inserted in the holes. Likewise, the leads of the heater plate are received through the case 29.

The cell is operated by applying an electric current to the heater plate 28 to achieve a temperature of about 300°C. Then, the positive lead 24 and the negative lead 25 are connected to an external circuit to produce an electric current. At the time of discharge, sodium within the elongated small holes 17 and the separator 11 will migrate as sodium ions through the wall of the separator 11 to the side containing molten sulfur. Molten sodium of an amount equal to that which has been consumed to the elongated, small holes 17 is supplied from the reservoir 13 through the stainless steel tube 15 and the passage 18 into the elongated, small holes 17 under the pressure of the aforementioned argon and by its own gravity. The electrons which have been produced at the time when sodium was ionized are transmitted through the molten sodium within the stainless steel tube 15 and the passage 18 to the reservoir 13 and then to the negative lead 25, through the external circuit, to the positive lead 24, to the casing 12, the pressure plate 22, graphite fibers 21, and the molten sulfur 23. At the time of charging, the sodium and electrons will shift in the direction opposite to the direction of the molten sodium and electrons at the time of discharge.

The mass of molten sodium contained in the separator 11 by virtue of the holes 17 and the passae 18 is typically about 1.8 grams. The surface area of the separator 11 may be about 60 square centimeters and thus the amount of molten sodium per unit of surface area of the separator 11 is reduced to as low as about 0.03 grams per square centimeter. In a conventional tabular separator as shown in FIG. 1, having a diameter of about 10 millimeters, the amount of molten sodium per unit surface area will be about 0.2 grams per square centimeter of about seven times as much. This provides a high level of safety in the event of breakage of the separator. Even if part of the separator 11 is broken, molten sodium in the separator 11 will not effuse entirely at the same time.

The stainless steel tube 15 of small diameter has excellent mechanical properties such as high impact resistance compared to the impact resistance of ceramics such as sintered beta alumina. Therefore, the reservoir 13 could hold most of the sodium used in the cell safely against shocks or impacts imposed on the cell. If a shock should destroy the separator 11, the breakage of the separator will not directly lead to damage of the reservoir 13 because the reservoir is independent of the separator 11. Even if the sodium in the separator 11 effuses through the stainless steel tube 15 to the outside, only a small amount of sodium will exit because the inner diameter of the tube 15 is very small and the stainless steel tube 15 is relatively long so that there is substantial flow resistance to the fluid within the tube 15. This eliminates the possibility of explosion due to sodium leakage. On the otherhand, where the interior of the reservoir 13 is maintained under reduced pressure, if the separator 11 is broken, the molten sulfur is apt to flow into the reservoir 13 through the tube 15 under the pressure existing on the sulfur side, rather than the sodium effusing from the sodium reservoir. However, the residual sodium within the tube 15 reacts with the sulfur, producing sulfides which have high melting points, thereby blocking the tube 15. This, then prevents the molten sulfur from flowing into the reservoir. We have found that in the case of a stainless steel tube having an inner diameter of 0.8 millimeters, sodium sulfide and sodium polysulfide are produced at a distance of 5 to 10 millimeters from the top edge of the separator, thereby clogging the stainless steel tube. The maximum inner diameter of the communicating tube 15 is about 2.5 millimeters to prevent the molten sulfur from flowing into the reservoir 13 and possibly causing an explosion there. The minimum inner diameter of the communicating tube should be about 0.2 millimeters. It was found that in using a communicating tube 15 having an inner diameter of 0.2 millimeters and a length of 150 millimeters under an internal pressure of about 100 millimeters of mercury within the reservoir 13, 8 grams per hour of sodium could be fed from the reservoir 13 to the separator 11.

The configuration of the communicating passage or tube 15 may be linear, in the form of a coil, or in the form of a block having perforations therein. The coil form as shown in the drawings is suitable for rendering the communicating tube 15 compact and serves the dual purpose as a damper for the reservoir 13 and separator 11, thus providing improved impact resistance capability for the cell.

The asbestor 36 packed in the case 29 and in the space formed between the reservoir 13 and the lid 19 contributes to the safety of the cell as well as working as a heat insulator. The asbestos forms a porous flexible body which can absorb certain strains applied to the case 29 of the cell and prevents the separator 11 and reservoir 13 from being destroyed. Since molten sodium permeates very little into the pores of a porous body made of inorganic fibers, molten sodium will not be absorbed into the asbestos body 36. Molten sulfur on the other hand tends to be absorbed into a porous body made of inorganic fibers. Molten sulfur emitted from the sulfur casing 12 will permeate quickly into the asbestos 36. Therefore, even if both the reservoir 13 and separator 11 are destroyed at the same time, it will not cause great amounts of molten sodium and sulfur to react with each other.

The smaller the cross-sectional area of the elongated small holes 17, the greater the increase in efficiency and safety of the cell. However, the reduction of cross-sectional area of the holes is govened by difficulties in manufacture as well as the amount of molten sodium which is to pass through the holes into the separator at the time of charging or discharging. It has been found that the minimum diameter of the holes should be on the order of 0.3 millimeters. The maximum diameter is in the neighborhood of 3 millimeters. The shortest distance between the inner surfaces of the elongated small holes 17 and the outer surfaces of the separator 11 should be about 3 millimeters or less. Also, the shortest distance between the two inner surfaces of two adjacent small holes should be about 3 millimeters or less.

The outer shape of the separator of the present invention may be varied according to the conditions for using the cell. The separator may be in the form of a thin plate or column. Whatever the shape of the separator is, the separator should have a plurality of elongated small holes extending in side-by-side relation therethrough in parallel relationship with the major faces, i.e., the working surfaces of the separator.

An alternative form of the invention is illustrated at FIGS. 4 and 5. Those figures ilustrate a separator 50 having elongated small holes 51 of an oval cross-section in the transverse central portion thereof. The small holes 51 are arranged in side-by-side relation at an equal spacing from each other. Upper and lower ribs 52 and 53 are fitted in the flange portions of the separator in an airtight manner, while two passages 54 and 55 are defined between the upper lid 52 and the lower lid 53 so as to be in communication with the elongated, small holes 51. Molten sodium is supplied from the reservoir through a connecting tube 56 which extends through the upper lid 52 then through the upper passage 54 and into the holes 51.

The provision of elongated, small holes 51 in the separator 50 of oval cross-sections whose major axes extend in parallel relation with the side wall of the separator 50 permits the use of small holes having wider inner surface area relative to the outer surface of the separator which contacts the molten sulfur, thereby reducing the number of holes required and simplifying the construction. The cross-sectional area of the holes should not, however, be so large as to hold a substantial amount of molten sodium. For this reason, the major axis of the oval cross-section of the holes (or the length of the longer side of holes of rectangular cross-section) should be below about 5 millimeters.

In this form of the invention, there are provided two passages, upper passage 54 and lower passage 55, both of which are in communication with the elongated small holes 51. This aids in extending the service life of the separator 50. More specifically, if the separator is used for a long period of time, there is likely to be produced minute or hear cracking locally in the separator, and the molten sulfur will make ingress into the cracking to produce sodium polysulfide which would block the small holes. The wall portions of the elongated holes then no longer serve as solid electrolyte. The continued local cracking may lead to breakage of the separator in its entirety. The two passages 54 and 55, even in the event of local cracking in the separator prevents molten sodium from being sealingly closes within the elongated holes 51. Even if one passage is blocked, the other passage remains open so that molten sodium will not be isolated within the holes.

A further modification is illustrated in FIGS. 6 and 7 of the drawings. These figures illustrate a separator 57 which is provided with integral ridge portions 58 having a semi-circular cross-section at the opposite edges and in the center portion of the front and rear surfaces thereof there are provided elongated, small diameter holes 59 extending through the separator 57 and parallel with the longer axes of the ridge portions 58 but in the central portion thereof. The holes 59 are disposed at equal spacing from each other. One of the elongated holes 59 extends through the ridge portion 58 along the centerline thereof. A lid 60 is fixedly mounted on the flange portion of the separator with a passage 61 being defined between the lid 60 and the top edge portion of the separator 57. The small diameter holes 59 are open to the passage 61. A communicating tube 62 extends through the center portion of the lig 60 for introducing molten sodium from the reservoir.

The separator 57 has considerable strength because the elongated ridge portions 58 serve as reinforcements for the separator and thus the separator is well adapted for use in a cell which is likely to be subjected to vibration. Furthermore, the outer surfaces of the ridge portions 58 have semicircular cross-sections which may be used as the outer surfaces of the separator which function as solid electrolyte so that this contributes to increasing the surface area of the separator. The reinforcing ridge portions may be provided on the separator only in the longitudinal direction thereof, and may also be provided in the lateral direction or in both directions.

The sodium-sulfur unit cell of the embodiment shown in FIGS. 8 and 9 is intended to be used in a heat chamber. In this embodiment, a separator 87 has a column shape and is housed in a casing 88 made of stainless steel. A reservoir 89 for sodium is fixedly mounted on the casing 88 in electrically insulating relation. The separator 87 may be produced by sintering a compression molded body of beta aluminum powder in the presence of vapors of sodium oxide. A plurality of small holes 90 extend axially along the peripheral surface of the column-shapaed separator 87. The upper portion of the casing 88 is formed with a flange portion on which there is a lid 91 fastened by means of glass solder. A passage 92 is defined by the inner surfaces of the flanges on the under surface of the lid 91. The top openings of the small holes 90 are open to the passage 92. A short stainless steel tube 93 extends through the center portion of the lid 91 and is rigidly secured thereto by glass solder. Surrounding the outer periphery of the separators 87 are graphite fibers 94 serving as current collectors. The graphite fibers 94 are elastically urged by an annular stainless steel pressure plate 95 having perforations therein. Welded to the upper and lower portions of the upper surface of the pressure plate 95 are two pair of spring plates 96. The separator 87 with the graphite fibers 94 and pressure plate 95 are inserted into the casing 88. The spring plates 96 on the pressure plate 95 maintain the separator 87 centered in the casing 88 and are adapted to transmit electrically collected by the graphite fibers 94 to the casing 88 by way of the pressure plate 95. The reservoir 89 is superposed on the lid 91 of the casing 88 and the lid is mounted on the casing in electrically insulated relation. The electric current produced by the cells extracted through a positive lead 99 welded to the casing 88 and through the negative lead 98 welded to the reservoir 89.

The provision of a separator in the form of a column facilitates the manufacture of a cell and provides a separator of high strength. Thus, the fixed type cell of this embodiment is able to produce a constant current for a long period of time.

The passage 92 in the separator 87 is communicated through a stainless steel tube 93 with the reservoir 89. The lid 91 of the separator 87 is removed to directly communicate the reservoir 89 with the passage 92 and the small diameter holes 90 may be arranged so as to open to the reservoir 89 directly. In this case, however, it is imperative that the upper wall of the separator 87, as well as the lid 91 be of sufficient strength so as to not cause damage or breakage in the construction under the reservoir 89.

The sodium-sulfur cells according to the present invention contain part of the molten sodium in the plurality of of elongated, small diameter holes provided in side-by-side relation in the solid electrolytic separator but in parallel with the outer surfaces of the separator. This materially reduces the amount of molten sodium within the separator and positions the molten sodium advantageously throughout the separator. Even if the separator is broken, molten sodium will not react with molten sulfur in an explosive manner, nor will there be an abrupt temperature rise, thereby insuring a high level of safety for the cell.

We claim as our invention:

1. A solid electrolytic separator comprising a body of solid electrolyte having a plurality of small holes extending in side-by-side relation in proximity to the outer surface of said body and parallel thereto, said body having a passage formed therein communicating with said holes.

2. A separator according to claim 1 in which said holes have circular cross-sections and diameters in the range from 0.3 to 3.0 millimeters.

3. A separator according to claim 1 in which said holes have oval cross-sections with their major axes extending parallel to said outer surface.

4. A separator according to claim 1 in which said body is in the form of a flat plate, said passage being formed in an edge of the plate and said holes extending from said passage to near the opposite edge of said plate.

5. A separator according to claim 4 in which a second passage is formed in the opposite edge, said second passage connecting to the botton ends of said holes.

6. A separator according to claim 1 wherein said body is in the form of a flat plate having at least one ridge formed integrally on the surface of said plate.

7. A separator according to claim 1 in which said body is cylindrical and said holes extend parallel to the axis of the cylinder.

8. A separator according to claim 1 wherein said body has a flange portion and a lid secured to said flange portion, said flange portion and said lid defining said passage therebetween.

9. A separator accoring to claim 1 wherein the shortest distance between the inner surfaces of said holes and the outer surfaces of said body is less than 3 millimeters.

10. A separator according to claim 1 wherein the distances between the peripheries of adjoining small holes is less than 3 millimeters.

11. A separator according to claim 1 wherein the solid electrolyte consists essentially of beta alumina.

12. A solid electrolyte separator comprising a rectangular flat body made of a solid electrolyte and having a thickness of about 3 millimeters, said body having a passage formed in one edge portion thereof and a plurality of straight holes of a diameter of about 1.5 millimeters extending in side-by-side relation from said passage to near the opposite edge of said rectangular flat plate.

13. A solid electrolytic separator comprising a main portion having a rectangular flat plate, said main portion having a plurality of straight holes extending in side-by-side relation from one of the edges of said rectangular flat plate to the opposite edge thereof, said plate having two flange portions provided on both edges and two rib portions secured to said flange portions so as to define two passages connecting with the holes.

14. A sodium-sulfur cell comprising a solid electrolytic separator having a body of solid electrolyte and a plurality of elongated small holes extending in side-by-side relation in the portion near the surfaces of said body and in parallel with the outer surface of said body, said body having at least one passage formed therein connected to said elongated small holes, a reservoir for holding molten sodium, connecting means between said reservoir and said separator for communicating said molten sodium thereto, a housing for containing molten sulfur, an electric connector immersed in said molten sulfur, a positive pole electrically connected to said molten sodium and a negative pole electrically connected to said electric collector.

15. A sodium-sulfur cell according to claim 14 wherein said connecting means is a metal tube having an inner diameter in the range from 0.2 to 2.5 millimeters, and said reservoir is made of metal.

16. A sodium-sulfur cell according to claim 15 which includes a space between said reservoir and said separator, an inorganic porous body in said space, and an inorganic heat insulator about said reservoir and said separator.

17. A sodium-sulfur cell according to claim 16 wherein said inorganic porous body and said inorganic heat insulator are composed of inorganic fibers.

18. A sodium-sulfur cell according to claim 14 wherein said connecting means are in the form of a coiled tube.

* * * * *